(12) United States Patent
Kang et al.

(10) Patent No.: US 10,585,428 B2
(45) Date of Patent: Mar. 10, 2020

(54) BUILDING ENERGY MANAGEMENT SYSTEM AND METHOD

(71) Applicant: ELECTRONICS AND TELECOMMUNICATIONS RESEARCH INSTITUTE, Daejeon (KR)

(72) Inventors: Dong-Oh Kang, Daejeon (KR); Ok-Gee Min, Daejeon (KR); Joon-Young Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 358 days.

(21) Appl. No.: 15/406,901

(22) Filed: Jan. 16, 2017

(65) Prior Publication Data

US 2017/0364051 A1 Dec. 21, 2017

(30) Foreign Application Priority Data

Jun. 21, 2016 (KR) .................. 10-2016-0077497

(51) Int. Cl.
*H02J 3/14* (2006.01)
*G05B 23/02* (2006.01)
*G05B 15/02* (2006.01)

(52) U.S. Cl.
CPC ......... *G05B 23/0286* (2013.01); *G05B 15/02* (2013.01); *G05B 23/0224* (2013.01); *G05B 2219/2642* (2013.01); *H02J 2003/143* (2013.01); *Y02B 70/3266* (2013.01); *Y04S 20/242* (2013.01)

(58) Field of Classification Search
CPC ........... G05B 23/0286; G05B 23/0224; G05B 15/02; G05B 2219/2642; H02J 2003/143
See application file for complete search history.

(56) References Cited

U.S. PATENT DOCUMENTS

| | | |
|---|---|---|
| 2012/0150454 A1 | 6/2012 | Lee et al. |
| 2012/0165989 A1 | 6/2012 | Han et al. |
| 2012/0166007 A1 | 6/2012 | Jeong et al. |
| 2013/0226353 A1 | 8/2013 | Park |
| 2013/0238136 A1 | 9/2013 | Jeong et al. |

(Continued)

FOREIGN PATENT DOCUMENTS

| | | |
|---|---|---|
| JP | 2015-119279 A | 6/2015 |
| KR | 10-2009-0066107 A | 6/2009 |
| KR | 10-2012-0035988 A | 4/2012 |

(Continued)

OTHER PUBLICATIONS

Wang, CN204129930U, Jan. 28, 2015, Translated by Google Patents website, pp. 1-3; retrieved on Mar. 27, 2019 from <URL: https://patents.google.com/patent/CN204129930U/en?oq=emergency+management+building+sensors+internet+of+things> (Year: 2015).*

(Continued)

*Primary Examiner* — Robert E Fennema
*Assistant Examiner* — Marzia T Monty
(74) *Attorney, Agent, or Firm* — NSIP Law

(57) ABSTRACT

The preset invention is directed to a building energy management system and method, more specifically to a building energy management system and method that can quickly detect and control an abnormal situation or an emergency situation that may occur within a building.

1 Claim, 6 Drawing Sheets

(56) References Cited

U.S. PATENT DOCUMENTS

2015/0105911 A1* 4/2015 Slupik ............... H04L 12/2816
   700/275
2015/0316907 A1   11/2015 Elbsat et al.

FOREIGN PATENT DOCUMENTS

| KR | 10-2012-0072106 A | 7/2012 |
| KR | 10-2012-0076662 A | 7/2012 |
| KR | 10-2012-0087274 A | 8/2012 |
| KR | 10-2013-0096907 A | 9/2013 |
| KR | 10-2013-0103102 A | 9/2013 |
| KR | 10-2014-0125245 A | 10/2014 |
| KR | 10-2015-0088094 A | 7/2015 |

OTHER PUBLICATIONS

Liu, CN102707689A, Oct. 3, 2012, Translated by Google Patents website, pp. 1-6; retrieved on Mar. 27, 2019 from <URL: https://patents.google.com/patent/CN102707689A/en?oq=target+control+emergency+management+building+sensors+internet+of+things> (Year: 2012).*

* cited by examiner

BUILDING ENERGY MANAGEMENT SYSTEM AND METHOD

CROSS-REFERENCE TO RELATED APPLICATIONS

This application claims the benefit of Korean Patent Application No. 10-2016-0077497, filed with the Korean Intellectual Property Office on Jun. 21, 2016, the disclosure of which is incorporated herein by reference in its entirety.

BACKGROUND

1. Technical Field

The present invention relates to a system and a method for managing building energy, more specifically to a building energy management system and a method thereof that can quickly detect and control an abnormal or emergency situation that may be occurred within a building.

2. Background Art

A building energy management system is a system for an optimal automated control of energy use by connecting various sensors connected to energy-consuming devices within a building through a communication network for real-time monitoring and analysis of collected data. The building energy management system manages the use of energy required by the building for heating and cooling, lighting, cooking, use of various appliances and machines, communication and ventilation, air conditioning, etc.

Meanwhile, as buildings are used in more various ways, a greater variety of energy-consuming items has been introduced. Since it is normally not possible to calculate the energy use based on the data collected from the sensors, the building energy management system analyzes and projects energy consumption by the building more accurately by use of additional information, such as surrounding temperature, temperatures of rooms or sections and human traffic. The building energy management system is generally constituted with various sensors, server, sensor-server communication network and control equipment. The building energy management system allows the information on the sensors to be transferred to a central server for analysis and controls the energy use by controlling various devices based on the analyzed information.

However, in the case of multiple buildings or an increased building size, a very large amount of data is generated, and thus an efficient, high-speed analysis or control is difficult for the building energy management system. This problem is expected to be magnified as there will be more cases of utilizing a large amount of sensor data, owing to the advancement of the Internet of Things technologies. Particularly, the centralized system of building energy management will face serious limitations if malfunctions or abnormal situations are to be detected and addressed.

The prior art of the present invention is disclosed in Korean Patent Publication 2009-0066107 (laid open on Jun. 23, 2009).

SUMMARY

The present invention provides a building energy management system and method that can analyze sensor information in a building and designate an optimal edge device that performs an analysis for a quick detection and control of an abnormal situation or an emergency situation that may occur within the building by considering connectivity between required information and a control device.

Objects of the present invention shall not be restricted to the above, and other objects not mentioned herein shall be apparent through the description provided below.

An aspect of the present invention provides a building energy management system.

The building energy management system in accordance with an embodiment of the present invention may include: a building energy management edge device, constituted with N levels, N being a natural number, and configured for generating analysis data based on collected control target sensor data, determining an abnormal or emergency situation based on the generated analysis data and transmitting control data to a building energy management control device; and a building energy management analysis server configured for determining an analysis structure for analysis and control of level cooperation of the building energy management edge device using connection structure information of the building energy management edge device.

Another aspect of the present invention provides a building energy management method.

The building energy management method in accordance with an embodiment of the present invention may include: receiving a variance analysis structure and selecting an analysis algorithm of a control target by receiving connection structure information of a building energy management edge device; determining sensor data for analysis of the control target; selecting a building energy management edge device at a lowest level collecting the determined sensor data; determining whether the building energy management edge device at the lowest level is connected with every building energy management sensor collecting the sensor data of the control target; selecting a building energy management edge device at a higher level connected with every building energy management sensor if it is determined that the building energy management edge device at the lowest level is not connected with every building energy management sensor; and configuring a communication channel for cooperative processing between the selected building energy management edge device and a building energy management analysis server.

The present invention allows for a variance cooperative analysis of an abnormal situation or an emergency situation through a dynamic selection of an analysis edge device and thus can improve an availability ratio of resources of an overall system by utilizing unused resources.

The present invention allows for a speedy detection and control of an abnormal situation or an emergency situation owing to the analysis and control at an edge device, enables an analysis algorithm to run effectively, and saves the costs of variance cooperative analysis through a reduction in the consumption amount of resources.

DETAILED DESCRIPTION

A certain embodiment of the present invention will be described in detail with reference to the accompanying drawings so that those who are ordinarily skilled in the art to which the present invention pertains can readily work the invention. The present invention can be realized in various other forms and shall not be limited to the embodiment described herein. Moreover, when a portion is described to "include" or "comprise" an element, it shall mean that the portion can further include another element, rather than excluding any other element, unless otherwise described explicitly.

Hereinafter, detailed description for embodying the present invention will be provided, with reference to the accompanying drawings.

Figure 1:
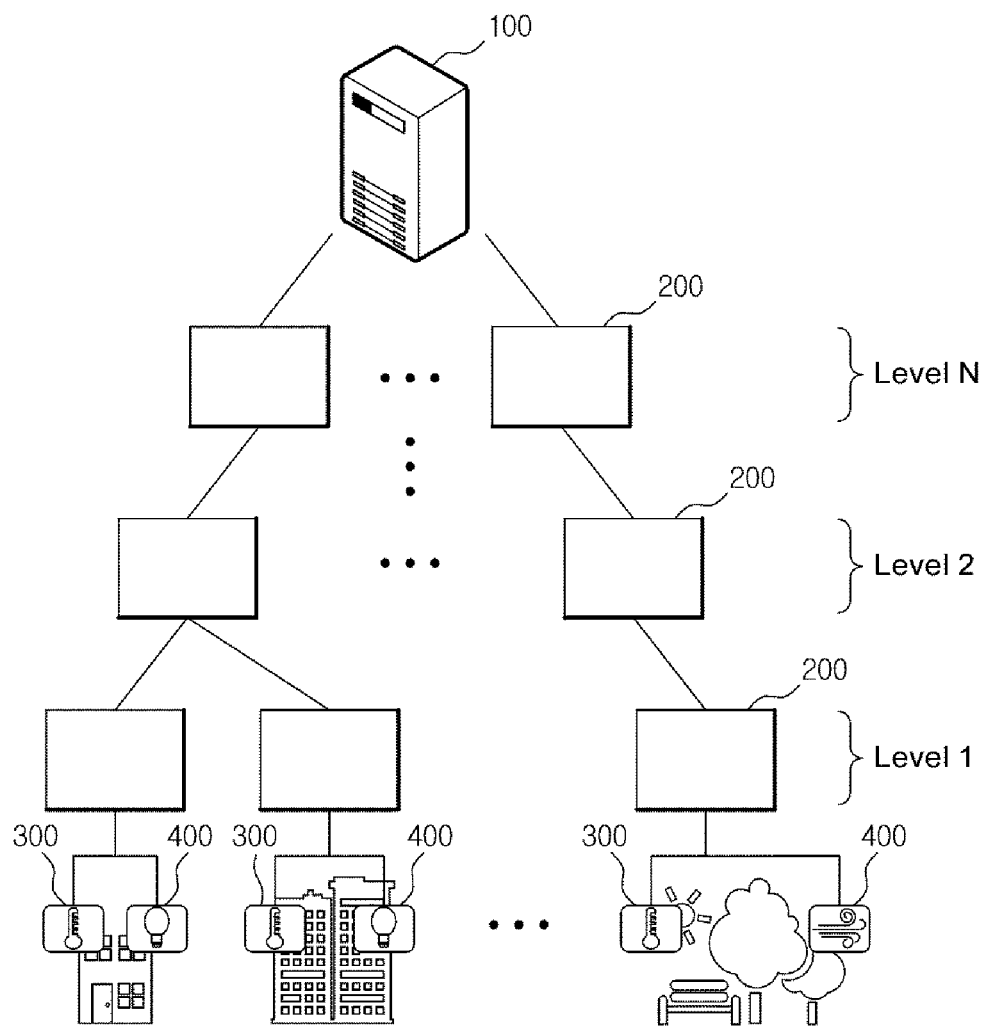
FIG. 1 to FIG. 3 illustrate a building energy management system in accordance with an embodiment of the present invention.

FIG. 1 illustrates a building energy management system in accordance with an embodiment of the present invention.

Referring to FIG. 1, the building energy management system includes building energy management analysis server 100, building energy management edge device 200, building energy control device 300 and building energy management sensor 400.

The building energy management analysis server 100 manages energy consumption of a building. The building energy management analysis server 100 receives building energy analysis data based on building energy sensor data from the building energy management edge device 200 and generates control data for controlling the building energy control device 300 based on the received building energy analysis data to optimize building energy. The building energy management analysis server 100 may configure an analysis server with a plurality of server clusters. Here, the server clusters may be constituted with, for example, a front end server and a back end server. The building energy management analysis server 100 may be logically considered as a single server.

The building energy management edge device 200 collects sensor data from the building energy management sensor 300 in order to analyze an abnormal or emergency situation in building energy management. The building energy management edge device 200 processes the collected sensor data and performs an analysis algorithm with the processed sensor data to analyze the abnormal or emergency situation. The building energy management edge device 200 determines the abnormal or emergency situation based on the analyzed result and performs a proper building energy control. Analyzing the abnormal or emergency situation and performing the building energy control will be described later in detail with reference to FIG. 2.

Moreover, the building energy management edge device 200 may transfer the sensor data to the building energy management analysis server 100 or transfer a control command to the building energy control device 300. The building energy management edge device 200 provides computing for analysis based on computing resources. The building energy management edge device 200 may be any one of, for example, an Internet of Things (IoT) gateway, a bridge and a communication router.

Moreover, the building energy management edge device 200 may be connected in a tree structure having N levels, N being a natural number. The building energy management edge device 200 may collect building energy management sensor data and transmit the collected building energy management sensor data to the building energy management edge device 200 at an upper level or to the building energy management analysis server 100.

The building energy control device 300 controls production or consumption of building energy. The building energy control device 300 may be, for example, a lighting control device, a heating control device or an air-conditioning control device. The building energy control device 300 receives control data from the building energy management edge device 200 and performs energy control based on the received control data.

The building energy management sensor 400 senses production or consumption of building energy. The building energy management sensor 400 may be, for example, a light sensor, a temperature sensor or a carbon monoxide sensor.

Figure 2:
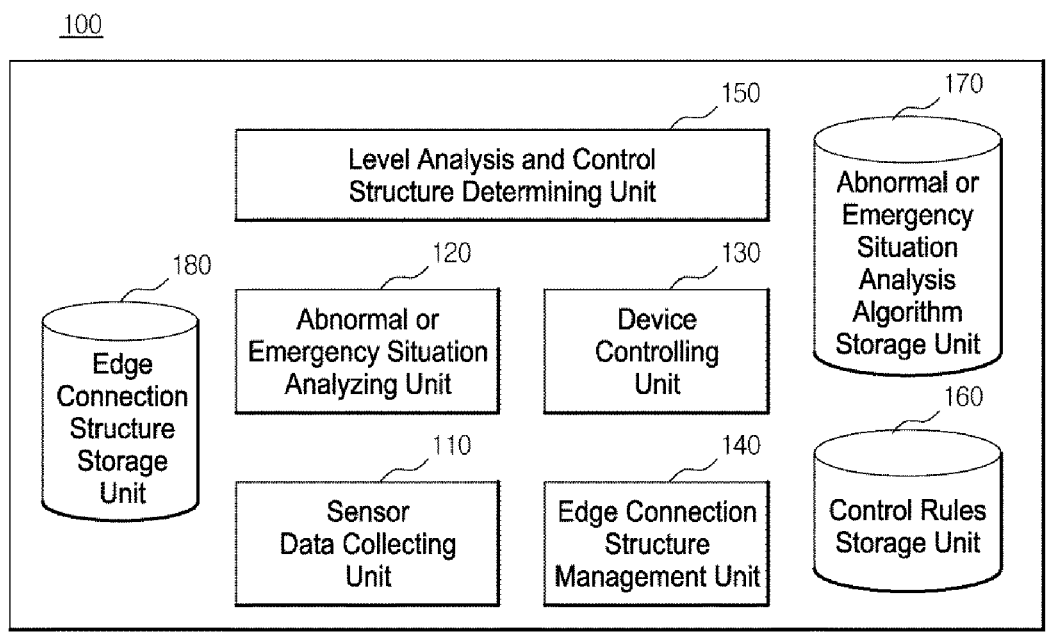
Figure 3:
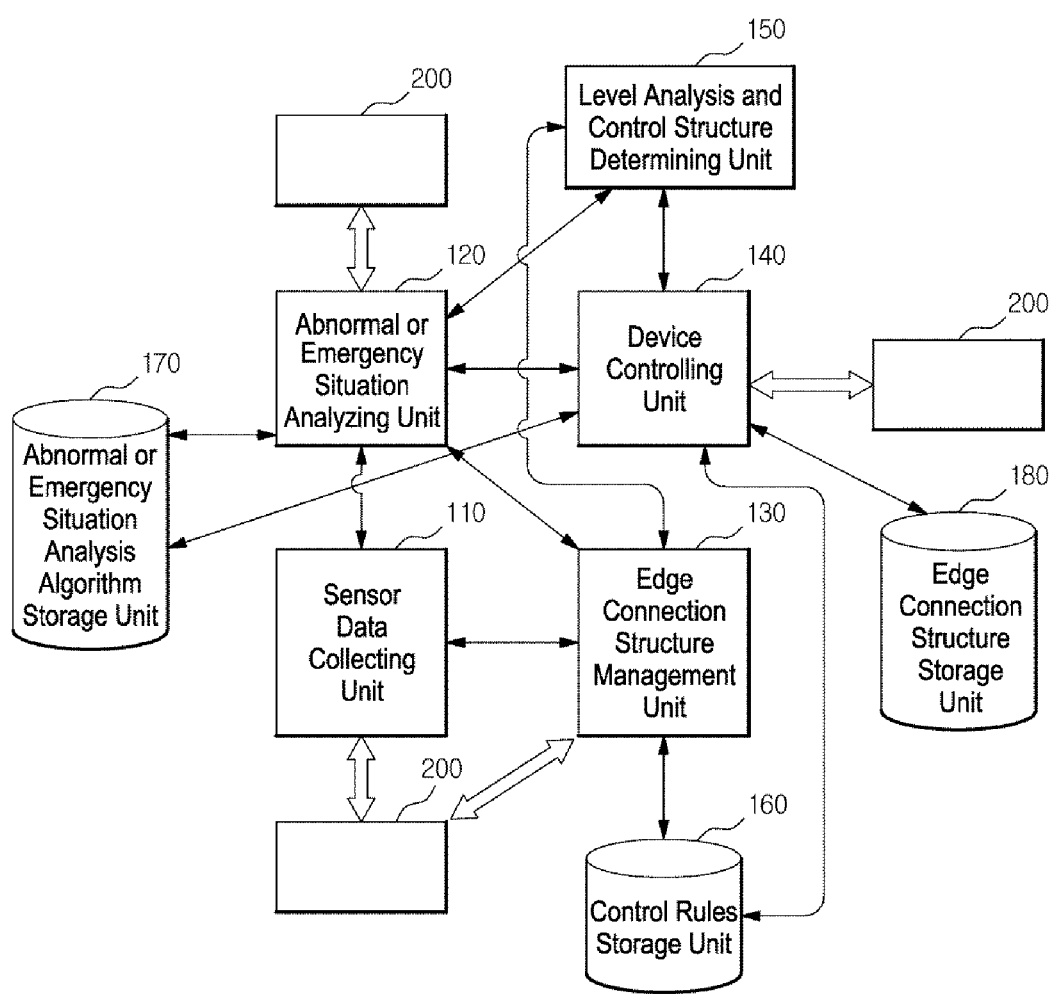

FIG. 2 and FIG. 3 are provided to illustrate the building energy management analysis server in accordance with an embodiment of the present invention.

Referring to FIG. 2 and FIG. 3, the building energy management analysis server 100 includes a sensor data collecting unit 110, an abnormal or emergency situation analyzing unit 120, a device controlling unit 130, an edge connection structure management unit 140, a level analysis and control structure determining unit 150, a control rules storage unit 160, an abnormal or emergency situation analysis algorithm storage unit 170 and an edge connection structure storage unit 180.

The sensor data collecting unit 110 collects sensor data from the building energy management sensor 400 or receives the sensor data from the building energy management edge device 200 at a lower level. The sensor data collecting unit 110 may collect the sensor data in a streaming or polling form and provide the collected sensor data to the abnormal or emergency situation analyzing unit 120.

The abnormal or emergency situation analyzing unit 120 analyzes an abnormal or emergency situation using an abnormal or emergency situation analysis algorithm based on the sensor data. Here, the abnormal or emergency situation analysis algorithm may be selected from the abnormal or emergency situation analysis algorithm storage unit 170. The abnormal or emergency situation analyzing unit 120 performs the analysis algorithm for level analysis using the structure determined by the level analysis and control structure determining unit 150. According to this structure, a preprocessing result or a variance analysis result is received through communication with an edge abnormal or emergency situation analyzing unit 220 in the building energy management edge device 200 and utilized for final analysis, or an analysis result at the server is transferred to the edge abnormal or emergency situation analyzing unit 220 of the building energy management edge device 200 and utilized for edge analysis.

The device control unit 130 generates control data for controlling the building energy control device 300 according to control rules predetermined based on the analysis result. The device control unit 130 controls the building energy control device 300 using control rules stored in the control rules storage unit 160. The device control unit 130 generates the control data by applying the analysis result of the abnormal or emergency situation analyzing unit 120 and the sensor data collected by the sensor data collecting unit 110 to the control rules, and transfers the generated control data to the building energy control device 300.

The edge connection structure management unit 140 monitors connection and status information between the building energy management sensor 400 and the building energy management edge device 200, between the building energy control device 300 and the building energy management edge device 200, between the building energy management edge device 200 and another building energy management edge device 200, and between the building energy management edge device 200 and the building energy management analysis server 100. The edge connection structure management unit 140 generates building energy management edge connection structure information containing at least one of connection information and status information and stores the generated building energy management edge connection structure information in the edge connection structure storage unit 180. The edge connection structure management unit 140 transfers the building energy management edge connection structure information to the level analysis and control structure determining unit 150 and the abnormal or emergency situation analyzing unit 120 for level analysis and control structure determination and allows the building energy management analysis server 100 and the building energy management edge device 200 to facilitate cooperative analysis. With the determination of the level analysis and control structure determining unit 150, the edge connection structure management unit 140 sends an algorithm in building energy management abnormal or emergency situation algorithm to the building energy management edge device 200 and downloads the control rules in the control rules storage unit 160 to the building energy management edge device 200.

The level analysis and control structure determining unit 150 determines a variance structure of an algorithm for analyses for level cooperation and control. The level analysis and control structure determining unit 150 determines an optimal variance analysis structure by receiving the building energy management edge connection structure information from the edge connection structure management unit 140. The level analysis and control structure determining unit 150 selects an analysis algorithm of a control device to be controlled first and determines required sensor data. The level analysis and control structure determining unit 150 selects a building energy management edge device 200 that includes all of the sensor data and can provide a computing capability at a closest distance from the building energy control device 300 and loads a main analysis algorithm therein. The level analysis and control structure determining unit 150 may utilize, for example, the Hamming distance measuring method for the measurement of distance.

The level analysis and control structure determining unit 150 determines whether the analysis algorithm is operable in the computing resources of the building energy management edge device 200 according to the structural level of the building energy management edge device and determines the building energy management edge device to run the main analysis algorithm. The level analysis and control structure determining unit 150 determines in the searched result whether the analysis algorithm is sufficient for operation in the computing resources of the pertinent building energy management edge device 200 and, if it is determined that operation is difficult, elevates the level by one step to continue to check. When the building energy management edge device 200 to run the main analysis algorithm is finally determined, the level analysis and control structure determining unit 150 selects a building energy management edge device 200 to preprocess the determined lower level of building energy management edge device 200 most effectively. In the case of control rules utilizing the analysis result in the building energy management analysis server 100, the level analysis and control structure determining unit 150 configures a communication channel for allowing the analysis result of the building energy management analysis server 100 to be considered in the abnormal or emergency situation analyzing unit 120 for connection with the abnormal or emergency situation analyzing unit 120.

The control rules storage unit 160 stores rules for controlling the building energy management control device. The control rules storage unit 160 provides building energy management control rules to the device controlling unit 130 or to the building energy management edge device 200.

The abnormal or emergency situation analysis algorithm storage unit 170 stores an abnormal or emergency situation algorithm for determining the building energy management abnormal or emergency situation. The abnormal or emergency situation analysis algorithm storage unit 170 is configured with a code library to allow an algorithm to be executed in a downloaded module. The abnormal or emergency situation analysis algorithm storage unit 170 may include a machine learning algorithm, such as linear regression or clustered sampling, or an algorithm for extracting a statistical value, such as a mean value or standard deviation. The abnormal or emergency situation analysis algorithm storage unit 170 provides the abnormal or emergency situation algorithm to the abnormal or emergency situation analyzing unit 120 or to the building energy management edge device 200.

The edge connection structure storage unit 180 stores edge connection structure information received from the edge connection structure management unit 140. The edge connection structure storage unit 180 may be configured with database. The edge connection structure storage unit 180 may provide a required connection structure in response to a query of the edge connection structure management unit 140.

Figure 4:
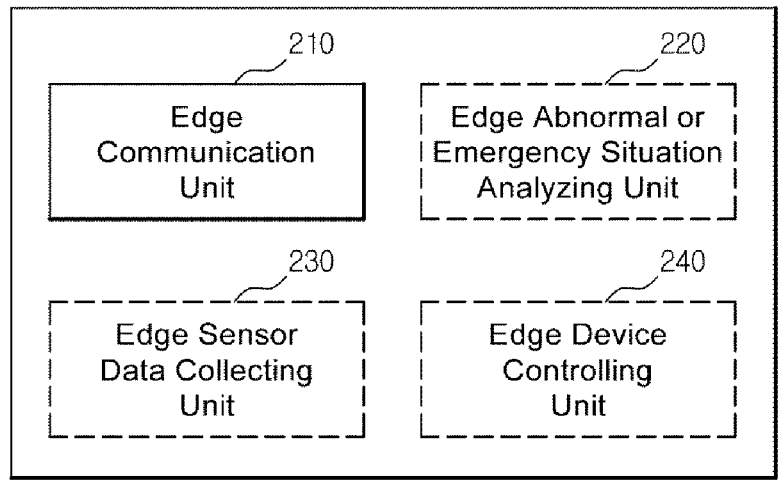
FIG. 4 to FIG. 7 illustrate a building energy management method in accordance with an embodiment of the present invention.
Figure 5:
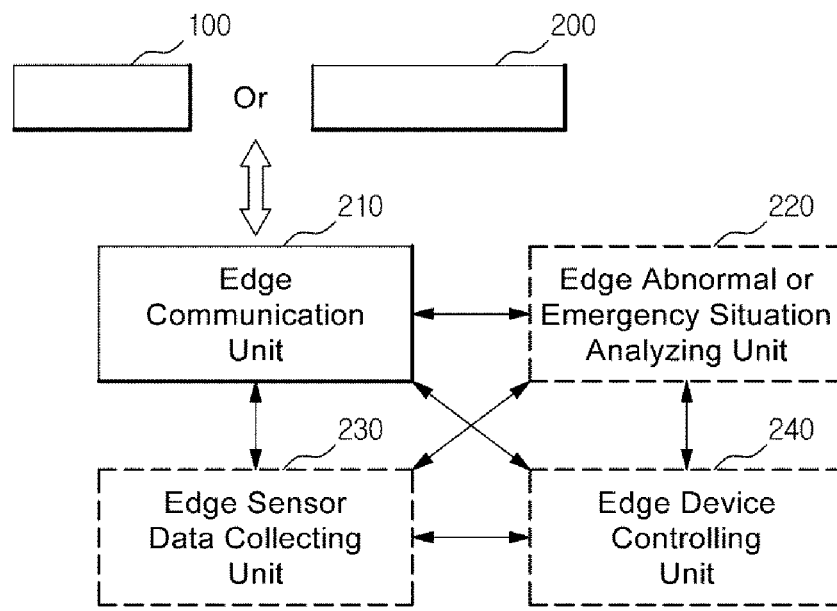

FIG. 4 and FIG. 5 illustrate a building energy management edge device in accordance with an embodiment of the present invention.

Referring to FIG. 4 and FIG. 5, a building energy management edge device 200 includes an edge communication unit 210, an edge abnormal or emergency situation analyzing unit 220, an edge sensor data collecting unit 230 and an edge device controlling unit 240.

The edge communication unit 210 handles communication with an external device at a higher level in the building energy management edge device 200. The edge communication unit 210 exchanges sensor data, control rules, analysis algorithm or device control signals with the building energy management analysis server 100. The edge communication unit 210 manages each of the sensor data with information on the building energy management edge device 200 at an upper level or the building energy management analysis server 100 and transfers the sensor data elevated from a lower level to the pertinent building energy management edge device 200 or the building energy management analysis server 100. Moreover, the edge communication unit 210 may also include information on the type of sensor and information for communication with the building energy management edge device 200 at a lower level, in addition to the sensor data.

The edge abnormal or emergency situation analyzing unit 220 analyzes the sensor data in order to determine an abnormal or emergency situation. The edge abnormal or emergency situation analyzing unit 220 may download and use an analysis algorithm from the building energy management analysis server 100. Here, the analysis algorithm may be run in the form of an application program. If the main analysis algorithm is loaded, the actual analysis algorithm is run, but in the case of a building energy management edge device at a lower level of the building energy management edge device 200 that has loaded the main analysis algorithm, the edge abnormal or emergency situation analyzing unit 220 may perform a preprocessing. The edge abnormal or emergency situation analyzing unit 220 may receive data required for analysis from the edge sensor data collecting unit 230 and transfer the analysis result to the edge device controlling unit 240 for utilization in the control rules.

The edge sensor data collecting unit 230 collects the sensor data. The edge sensor data collecting unit 230 may transfer the sensor data to the building energy management edge device 200 at an upper level or the building energy management analysis server through the edge communication unit 210. For an edge analysis, if necessary, the edge sensor data collecting unit 230 may transfer the sensor data to the edge abnormal or emergency situation analyzing unit 220 to have the analysis algorithm run. The edge sensor data collecting unit 230 transfers the sensor data for the control rules of the edge device controlling unit 240. The edge sensor data collecting unit 230 may manage, or share with the edge communication unit 210, information on the type of sensor and information on the building energy management edge device 200 at a lower level, in addition to the received sensor data.

The edge device controlling unit 240 runs the control rules based on the analysis result of the edge abnormal or emergency situation analyzing unit 220 and the sensor data of the edge sensor data collecting unit 230 to control the building energy management control device. In the case where the edge device controlling unit 240 is selected as the building energy management edge device 200 for main analysis, the edge device controlling unit 240 downloads and runs the pertinent control rules from the building energy management analysis server 100.

Figure 6:
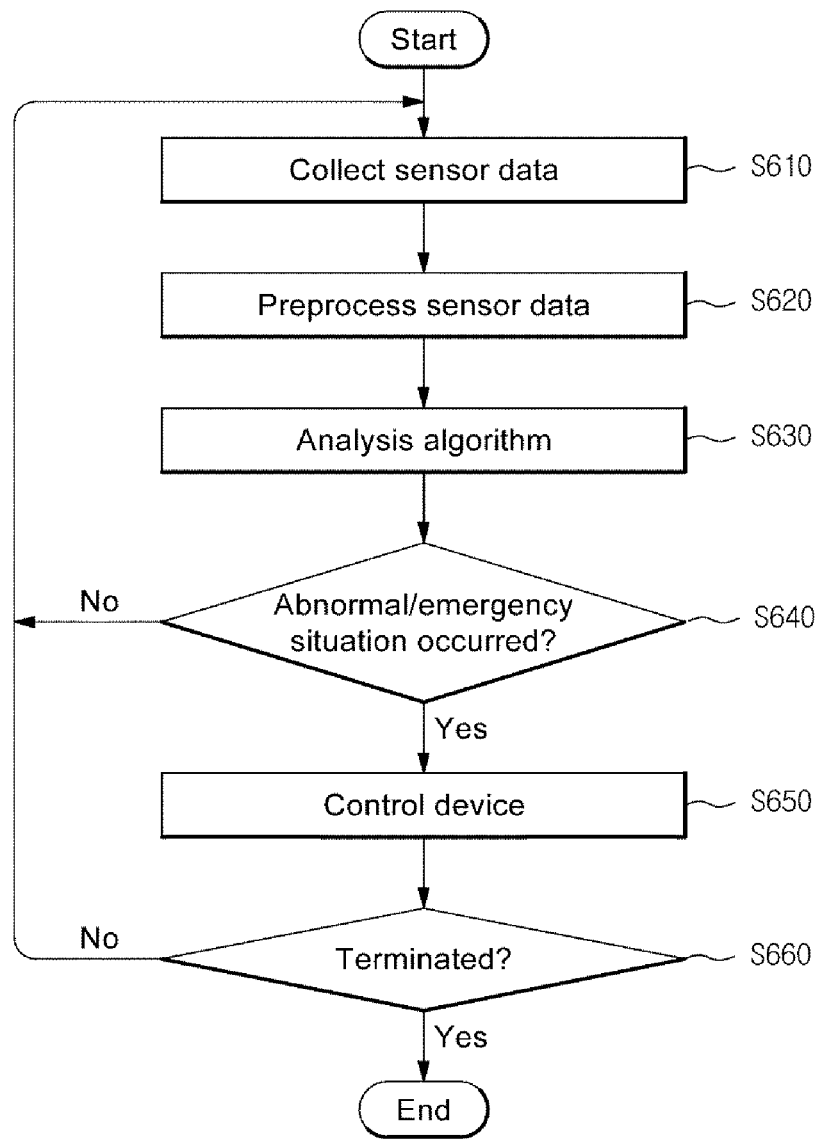
Figure 7:
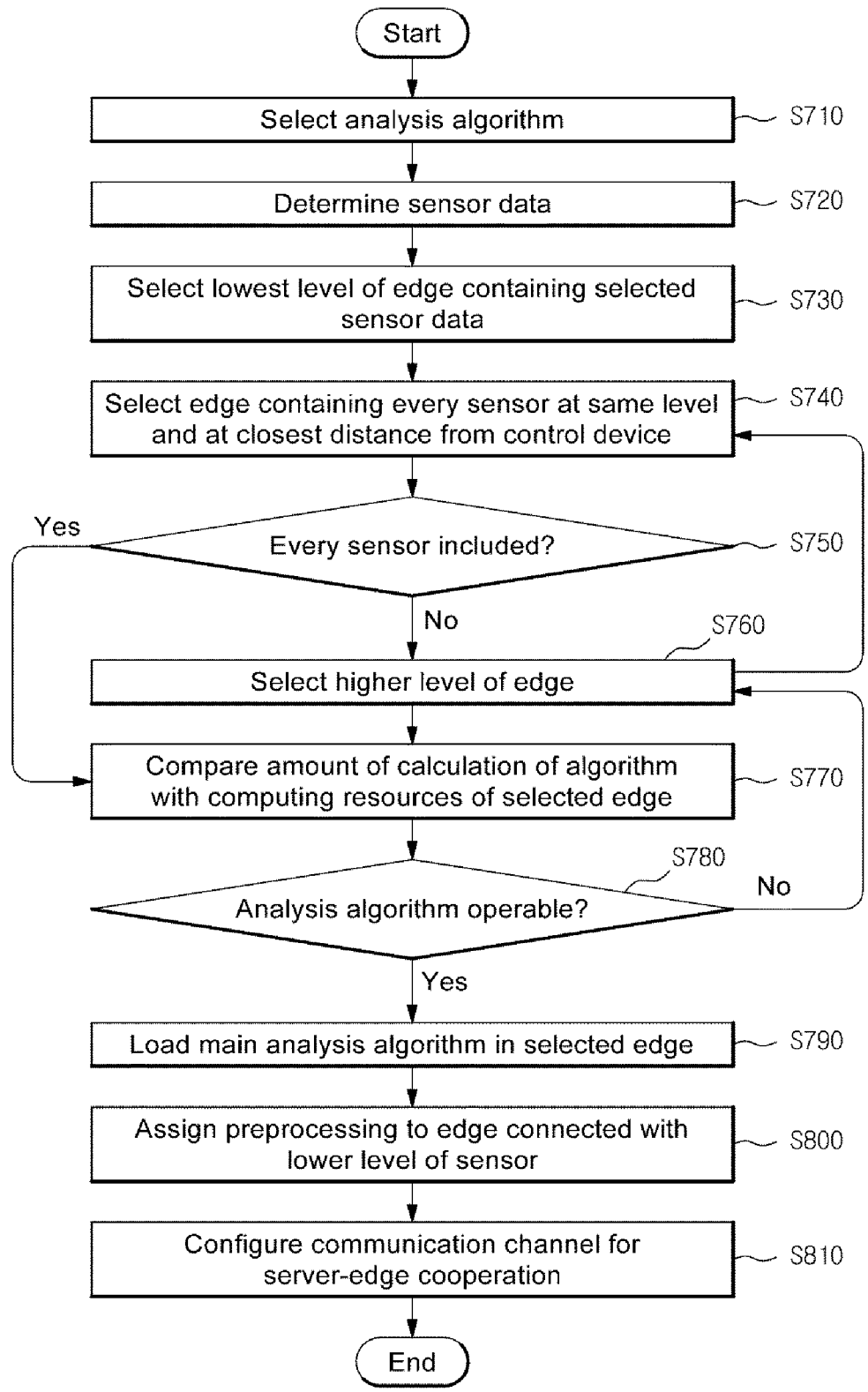

FIG. 6 and FIG. 7 illustrate a building energy management method in accordance with an embodiment of the present invention.

Referring to FIG. 6, in step S610, the building energy management system collects sensor data. Specifically, the building energy management sensor 400 collects sensor data of a control target.

In step S620, the building energy management system preprocesses the sensor data. The building energy management edge device 200 performs the preprocessing of the sensor data by being connected with the building energy management sensor 40 that has collected the sensor data. Here, the preprocessing may be at least one of conversion and operation of the sensor data for analysis of the control target.

In step S630, the building energy management system runs an abnormal or emergency situation analysis algorithm to generate analysis result information. The building energy management edge device 200 runs the analysis algorithm by being configured based on the amount of provided resources and the amount of calculation of analysis algorithm. The building energy management edge device 200 may be a building energy management edge device at a level that can receive all of the sensor data of the control target. The building energy management analysis server 100 may cooperatively perform analysis of the control target if the building energy management edge device 200 has an insufficient amount of provided resources or is not able to receive all of the sensor data of the control target.

In step S640, the building energy management system determines whether an abnormal or emergency situation has occurred. The building energy management edge device 200 determines the abnormal or emergency situation by comparing predetermined criteria with the analysis result information.

In step S650, the building energy management system control the building energy control device 300 if an abnormal or emergency situation has occurred. The building energy management edge device 200 controls the building energy control device 300 according to a predetermined control algorithm if an abnormal or emergency situation has occurred.

In step S660, the building energy management system determines whether the abnormal or emergency situation has been terminated. The building energy management edge device 200 may repeat the above-described steps S610 to S650 until the abnormal or emergency situation is terminated.

Referring to FIG. 7, in step S710, the building energy management analysis server 100 determines an optimal variance analysis structure by receiving connection structure information of the building energy management edge device 200, and selects the abnormal or emergency situation analysis algorithm of the control target.

In step S720, the building energy management edge device 200 determines sensor data for analyzing the selected control target.

In step S730, the building energy management analysis server 100 selects the building energy management edge device 200 at the lowest level that is connected with the building energy management sensor 400 collecting the determined sensor data.

In step S740, the building energy management analysis server 100 selects a building energy management edge device 200 that contains every building energy management sensor 400 at a same level and is at a closest distance from the building energy control device associated with the control target. Here, the measurement of the distance may be made by, for example, the Hamming distance measuring method.

In step S750, the building energy management analysis server 100 determines whether the selected building energy management edge device 200 is connected with every building energy management sensor 400 collecting the sensor data associated with the control target.

In step S760, if not every building energy sensor 400 is connected, the building energy management analysis server 100 selects the building energy management edge device 200 at a higher level of the initially-selected building energy management edge device 200.

In step S770, the building energy management analysis server 100 compares the amount of calculation of analysis algorithm with computing resources of the selected building energy management edge device 200 connected with every building energy management sensor 400.

In step S780, the building energy management analysis server 100 determines whether the pertinent analysis algorithm is operable in the computing resources of the selected building energy management edge device 200, and, if it is determined that operation is difficult, elevates the level by one step to continue to check.

In step S790, the building energy management analysis server 100 loads the main analysis algorithm if the pertinent analysis algorithm is operable with the computing resources of the selected building energy management edge device 200.

In step S800, the building energy management analysis server 100 assigns a preprocessing of sensor data to the building energy management edge device 200 at a lower level that is connected with the building energy management sensor 400.

In step S810, the building energy management analysis server 100 configures a communication channel through cooperative analysis with the building energy management edge device 200. If the control rules allow for utilization of an analysis result from the building energy management server 100, the building energy management edge device 200 may configure a communication channel that allows the analysis result of the building energy management analysis server 100 to be considered.

The building energy management method in accordance with various embodiments of the present invention may be implemented in the form of program instructions that are executable through various computer means and written in a computer-readable medium, which may include program instructions, data files, data structures, or the like, in a stand-alone form or in a combination thereof. The program instructions stored in the computer readable medium can be designed and configured specifically for the present invention or can be publically known and available to those who are skilled in the field of software. Examples of the computer readable medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions.

Hitherto, certain embodiments of the present invention have been described, and it shall be appreciated that a large number of permutations and modifications of the present invention are possible without departing from the intrinsic features of the present invention by those who are ordinarily skilled in the art to which the present invention pertains. Accordingly, the disclosed embodiments of the present invention shall be appreciated in illustrative perspectives, rather than in restrictive perspectives, and the scope of the technical ideas of the present invention shall not be restricted by the disclosed embodiments. The scope of protection of the present invention shall be interpreted through the claims appended below, and any and all equivalent technical ideas shall be interpreted to be included in the claims of the present invention.

What is claimed is:

1. A building energy management system, comprising:
a building energy management analysis server; and
a building energy management edge device including any one or any combination of any two or more of an edge Internet of Things (IoT) gateway, a bridge, and a communication router, and configured to
collect sensor data,
communicate with any one or any combination of any two or more of the building energy management analysis server, a building energy management edge server, and a building energy management sensor,
run an analysis algorithm when a main analysis algorithm is loaded,
process the sensor data for the analysis algorithm in response to another building energy management edge device at a lower level than the building energy management edge device loading the main analysis algorithm,
analyze the processed sensor data to determine an abnormal or emergency situation, and
control a building energy management controller when the abnormal or emergency situation is determined,
wherein the building energy management analysis server is configured to determine an analysis structure for analysis and control of a level cooperation of the building energy management edge device using connection structure information of the building energy management edge device, and
wherein the building energy management edge device and the another building energy management edge device constitute a structure having N levels, where N is a natural number.

\* \* \* \* \*